March 16, 1926.
E. T. MALLOY
1,576,924
RESILIENTLY TIRED WHEEL
Filed July 25, 1923
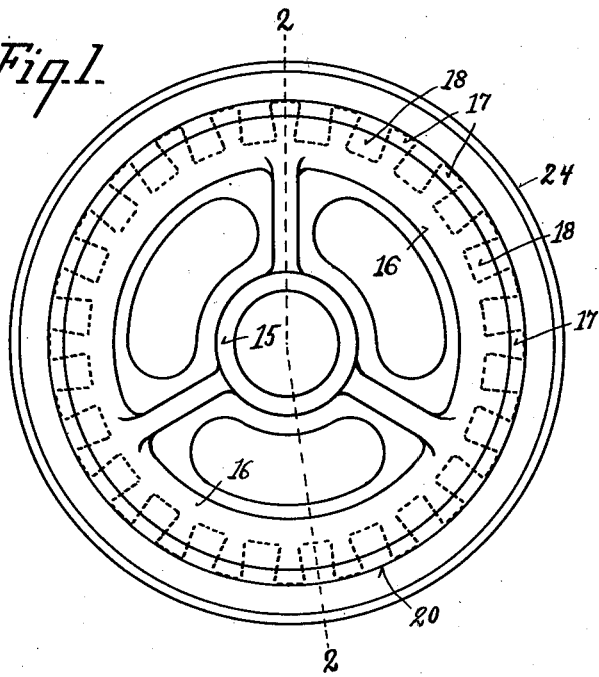
Fig.1.
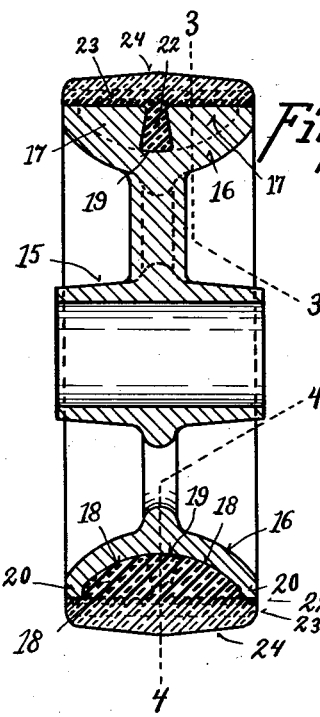
Fig.2.
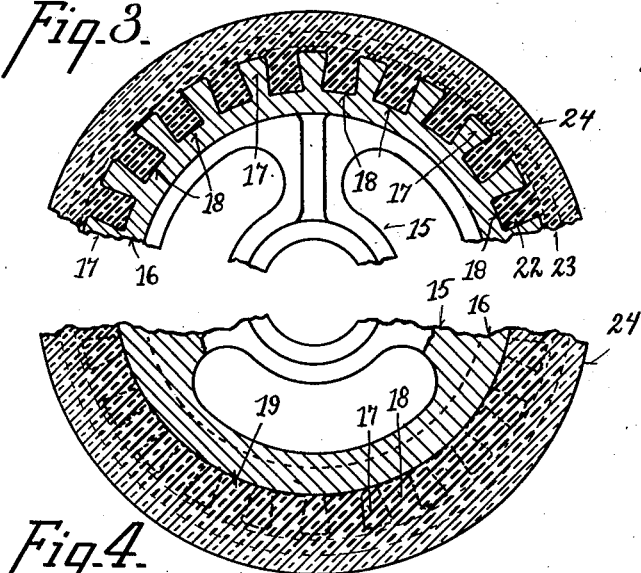
Fig.3.
Fig.4.
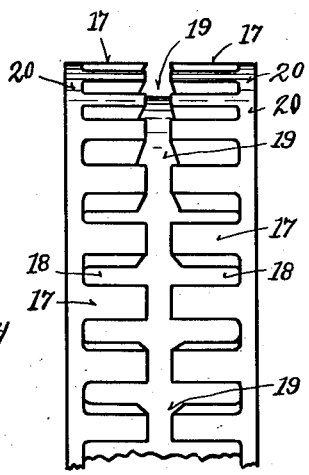
Fig.5.
Inventor
Edward T. Malloy,
By C. W. Miles,
Attorney Patented Mar. 16, 1926.

1,576,924

UNITED STATES PATENT OFFICE.

EDWARD T. MALLOY, OF HAMILTON, OHIO.

RESILIENTLY-TIRED WHEEL.

Application filed July 25, 1923. Serial No. 653,731.

*To all whom it may concern:*

Be it known that I, EDWARD T. MALLOY, citizen of the United States, residing at Hamilton, in the county of Butler and State of Ohio, have invented certain new and useful Improvements in Resiliently-Tired Wheels, of which the following is a specification.

My invention relates to improvements in resiliently tired wheels and method of producing the same. One of its objects is to provide an improved wheel as for instance a caster wheel having a resilient tire or tread, as for instance of rubber, adapted to smoothly and noiselessly support a vehicle. Another object is to provide improved means to attach the tires to the wheels so as to enable the tires to resist the various circumferential or creeping strains and lateral strains to which they are liable to be subjected and to thereby firmly retain their positions upon the wheels. Another object is to provide an improved tire in which the resilient quality varies in different portions of the tire, so that those portions in contact with the wheel are more rigid than those portions at the periphery or tread of the tires where the tires contact with the floor or road. Another object is to provide an improved method of attaching resilient tires to their wheels. My invention also comprises certain details and order of procedure, all of which will be fully set forth in the description of the accompanying drawings, in which:

Fig. 1, is a side elevation of a wheel and tire embodying my improvements.

Fig. 2, is a vertical section through the same taken on line 2—2 of Fig. 1.

Fig. 3, is a sectional detail taken on line 3—3 of Fig. 2.

Fig. 4 is a sectional detail taken on line 4—4 of Fig. 2.

Fig. 5, is a plan of a portion of the wheel rim before the tire is applied thereto.

The accompanying drawings illustrate the preferred embodiment of my invention in which 15 represents the wheel, as for instance a caster-wheel, which may be wholly or partly constructed of metal. It is preferable that the rim 16 of the wheel be of metal, and that said rim be provided with a series of teeth or projections 17 and intervening channels or recesses 18 adapted to engage the inner face of the tire and to interlock with portions of the tire forced into said recesses 18, so as to firmly and rigidly support the tire both circumferentially and laterally upon the rim 16, and to prevent displacement of the tire with reference to the rim.

The teeth 17 and recesses 18 may be of various patterns, but are preferably as shown arranged to dove-tail portions of the tire into the recesses of the rim to more effectually lock the tire to the rim. As shown the teeth 17 are arranged in two rows upon opposite sides of a circumferential series of recesses 19, into which the material of the rim is forced to more effectually lock the rim in place against lateral strains. If desired however for wheels subjected to moderate strains the recesses 19 may be omitted and the teeth 17 and recesses 18 relied upon to resist both creeping or circumferential strains and lateral strains. At opposite edges of the wheel where the joint between tire and wheel rim is exposed to view I preferably provide smooth circular relatively narrow flanges 20 which thus provide smooth circular meeting faces for the tire, having a finished appearance and which offer no projections liable to become engaged with extraneous objects or to break the uniformity of the meeting face or line between the tire and rim. Said flanges 20 also offer resistance to displacement of the tire from the rim due to lateral strain.

I have found it to be very difficult if not practically impossible to attach or anchor a tire composed entirely of resilient material to a wheel rim of rigid material. I therefore prepare the biscuit or green and unvulcanized tire material with a plurality of superimposed layers or strata radially of the tire, as for instance an inner layer 22, an intermediate layer 23, and an outer or tread layer 24. The composition of the inner layer 22 is chemically and mechanically such that when vulcanized it will become substantially or practically rigid, and firmly dove-tail and interlock with the teeth and projections of the rim to effectually prevent subsequent separation of the tire from the rim except by tearing or grinding it away in detail. The intermediate layer 23 is of a chemical and mechanical nature to be partially resilient in nature when vulcanized that is more resilient than the layer 22 and less resilient than the outer layer 24. The outer or tread layer 24 is of a chemical and mechanical nature when vulcanized to furnish a relatively more resilient layer than layer 23, and to provide a tough strong resilient tire tread adapted to contact with the floor or other support over which it travels upon a relatively extended surface and to roll over the floor or support practically noiselessly and with slight vibration to the truck or vehicle.

In practice the biscuit or green unvulcanized tire composed of several layers firmly united together in the unvulcanized state is prepared and applied in a mold or retaining jacket to the wheel rim to which it is to be attached. The green rim is then warmed or gently heated until it becomes sufficiently plastic, whereupon mechanical or pneumatic pressure is applied to force the inner layer 22 of the tire material firmly into the recesses 18 or 18 and 19 between the teeth 17 and between the side flanges 20. The pressure at the same time forces the tire in contact with the periphery of the flanges 20 and molds or shapes the tread and exposed faces of the tire, while any excess of material is forced in a thin sheet inwardly past the side faces of the flanges 20 where it may be trimmed away. The wheel rim and attached tire are now exposed to an increased degree of heat to effect a vulcanization of the several layers of the tire at one operation, whereby the inner layer 22 is converted into a substantially rigid material firmly and rigidly interlocked with the projections of the wheel rim, and the layers 23 and 24 are converted into resilient tire material each layer 22, 23, and 24 inseparably united to its adjacent layer, and the tire inseparably united to the wheel rim.

The wheel and method of formation herein shown and described are capable of considerable modification without departing from the spirit of my invention.

What I claim is:

A resiliently tired wheel comprising a wheel having a rim of substantially rigid material provided with unbroken peripheral side walls and with dove-tail projections leading therefrom toward the center of said rim and a circumferential dove-tail groove intermediate of the inner ends of said dove-tail projections, a tire of the full width of said rim having a tire section of substantially rigid material filling said circumferential groove and the lateral dove-tail spaces leading therefrom between the dove-tail projections of the rim and in contact with the unbroken peripheral faces of the rim at the sides of the rim, and a tire tread section of resilient material formed integral with said rigid tire section.

In testimony whereof I have affixed my signature.

EDWARD T. MALLOY.